United States Patent
Chernov et al.

(10) Patent No.: US 12,551,827 B2
(45) Date of Patent: Feb. 17, 2026

(54) POWER AND COMMUNICATION DELIVERY CONFIGURATION FOR A WATER FILTRATION ASSEMBLY OF AN APPLIANCE

(71) Applicant: Haier US Appliance Solutions, Inc., Wilmington, DE (US)

(72) Inventors: Gregory Sergeevich Chernov, Louisville, KY (US); Bradford Gasior, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 308 days.

(21) Appl. No.: 18/176,925

(22) Filed: Mar. 1, 2023

(65) Prior Publication Data
US 2024/0293765 A1    Sep. 5, 2024

(51) Int. Cl.
*B01D 35/30*    (2006.01)
*C02F 1/00*    (2023.01)
*F25D 17/02*    (2006.01)

(52) U.S. Cl.
CPC .............. *B01D 35/30* (2013.01); *C02F 1/003* (2013.01); *F25D 17/02* (2013.01);
(Continued)

(58) Field of Classification Search
CPC ...... B01D 35/30; C02F 1/003; C02F 2307/10; C02F 2307/12; F25D 17/02
See application file for complete search history.

(56) References Cited

U.S. PATENT DOCUMENTS

| 4,698,164 A | 10/1987 | Ellis |
| 5,144,775 A | 9/1992 | Bakanowsky, III |

(Continued)

FOREIGN PATENT DOCUMENTS

| CN | 102087333 B | 1/2016 |
| CN | 205127526 U | 4/2016 |

(Continued)

OTHER PUBLICATIONS

CDC: Fact Sheet About What to Do During a Boil Water Advisory, accessed chromeextension://efaidnbmnnnibpcajpcglclefindmkaj/ https://www.cdc.gov/healthywater/emergency/dwa-comm-toolbox/before/tools/Fact-Sheet-About-What-to-Do-During-BWA-508.pdf on Feb. 29, 2024, 4 pages.

*Primary Examiner* — Benjamin L Lebron
(74) *Attorney, Agent, or Firm* — Dority & Manning, P.A.

(57) ABSTRACT

An appliance includes an appliance wall, a water filtration assembly having a filtration housing mounted to the appliance wall via a manifold, and an electrical connection electrically coupling the water filtration assembly to a power source. The water filtration assembly includes at least one fluid inlet port and at least one fluid outlet port secured to the manifold for receiving fluid from a fluid source. The electrical connection is separate and spaced apart from the manifold. The electrical connection includes at least one first and second electrical contacts. When the first electrical contact(s) contacts the second electrical contact(s), power and/or one or more signals for communication/sensing is provided to the water filtration assembly. Further, the first electrical contact(s) is arranged on the filtration housing to align with the second electrical contact when the filtration housing is mounted to the appliance wall regardless of an orientation of the filtration housing.

6 Claims, 9 Drawing Sheets

(52) U.S. Cl.
CPC ...... *C02F 2307/10* (2013.01); *C02F 2307/12* (2013.01); *F25D 2323/121* (2013.01)

(56) References Cited

U.S. PATENT DOCUMENTS

| | | |
|---|---|---|
| 5,873,995 A | 2/1999 | Huang |
| 5,882,507 A | 3/1999 | Tanner et al. |
| 5,997,734 A | 12/1999 | Koski et al. |
| 6,428,708 B1 | 8/2002 | Halemba et al. |
| 7,182,672 B2 | 2/2007 | Tunaboylu et al. |
| 7,384,496 B2 | 6/2008 | Cote et al. |
| 8,002,235 B2 | 8/2011 | Vyawahare et al. |
| 8,337,693 B2 | 12/2012 | Mitchell |
| 8,944,284 B2 | 2/2015 | Milan |
| 9,620,996 B2 | 4/2017 | Zeine et al. |
| 9,839,868 B2 | 12/2017 | Fritze |
| 10,406,461 B2 | 9/2019 | Subrahmanya et al. |
| 10,450,203 B2 | 10/2019 | Schuster |
| 10,786,768 B2 | 9/2020 | Fritze |
| 10,843,107 B2 | 11/2020 | Bippus et al. |
| 10,926,206 B1 | 2/2021 | Chernov et al. |
| 10,946,319 B2 | 3/2021 | Subrahmanya et al. |
| 11,025,447 B2 | 6/2021 | Ebrom et al. |
| 2014/0223715 A1 | 8/2014 | Bippus et al. |
| 2016/0075566 A1 | 3/2016 | Froelicher |
| 2016/0304359 A1 | 10/2016 | Cur et al. |
| 2018/0008916 A1 | 1/2018 | Krause et al. |
| 2018/0178148 A1 | 6/2018 | Mazor et al. |
| 2020/0306672 A1* | 10/2020 | Subrahmanya ....... G01M 3/007 |
| 2021/0077927 A1 | 3/2021 | Fritze |
| 2022/0154989 A1 | 5/2022 | Kim et al. |
| 2022/0218344 A1* | 7/2022 | Leimbach ................ A61L 2/07 |

FOREIGN PATENT DOCUMENTS

| | | |
|---|---|---|
| CN | 107077632 B | 12/2018 |
| CN | 111442602 A | 7/2020 |
| DE | 102006026688 A1 | 12/2007 |
| EP | 3242376 B1 | 8/2019 |
| GB | 2240081 A | 7/1991 |
| JP | S60155072 A | 8/1985 |
| KR | 100296727 B1 | 7/2001 |
| KR | 101566282 B1 | 11/2015 |
| KR | 20170091984 A | 8/2017 |
| WO | WO2010118519 A1 | 10/2010 |
| WO | WO2018235030 A1 | 12/2018 |

* cited by examiner

POWER AND COMMUNICATION DELIVERY CONFIGURATION FOR A WATER FILTRATION ASSEMBLY OF AN APPLIANCE

FIELD OF THE INVENTION

The present subject matter relates generally to refrigerator appliances, and more particularly to a power and/or communication delivery configuration for a water filtration assembly of a refrigerator appliance.

BACKGROUND OF THE INVENTION

Refrigerator appliances generally include a cabinet that defines a chilled chamber. A wide variety of food items may be stored within the chilled chamber. The low temperature of the chilled chamber relative to ambient atmosphere assists with increasing a shelf life of the food items stored within the chilled chamber. Refrigerator appliances may also be equipped with a dispensing system. Such dispensing systems typically provide chilled water and/or ice from inside of the refrigerator appliance to a dispensing outlet accessible from inside or outside of the refrigerator appliance.

Certain refrigerator appliances further include water filter assemblies for filtering water. Water filter assemblies can filter water entering the refrigerator appliances to provide filtered water to various refrigerator appliance components, such as an ice maker and/or a water dispenser of the aforementioned dispensing system. Such filtering can improve a taste and/or an appearance of water within the refrigerator appliances.

The water filter assemblies may include one or more features that require power, such as various lights, sensors, valves, actuators, filtration means, hardware, etc. Conventionally, the water is routed in and out of the filter assembly through a filter manifold, which is generally a permanent component of the refrigerator appliance. As such, the power is typically transferred or supplied to the internal electrical components of the water filter assemblies via integration of electrical connections into the manifold. However, power through the manifold can increase the risk of water exposure to the electrical components of the filter assembly. In addition, routing the power through the manifold can also increase the complexity of the design of the manifold.

Other filtration assemblies may thus use wireless electrical components. However, wireless technology can increase the costs of the overall appliance as well as the water filtration assembly, which in certain circumstances, may be undesirable.

In view of the aforementioned, the present disclosure is directed to a unique power and/or communication delivery configuration for a water filtration assembly of a refrigerator appliance.

BRIEF DESCRIPTION OF THE INVENTION

Aspects and advantages of the invention will be set forth in part in the following description, or may be obvious from the description, or may be learned through practice of the invention.

In an aspect, the present disclosure is directed to an appliance having an appliance wall and a water filtration assembly having a filtration housing and mounted to the appliance wall via a manifold. The water filtration assembly further includes at least one fluid inlet port and at least one fluid outlet port secured to the manifold for receiving fluid from a fluid source. Further, the water filtration assembly includes an electrical connection electrically coupling the water filtration assembly to a power source. The electrical connection is separate and spaced apart from the manifold. The electrical connection includes at least one first electrical contact and at least one second electrical contact. As such, when the at least one first electrical contact contacts the at least one second electrical contact, at least one of power or one or more signals for communication or sensing is provided to the water filtration assembly. Further, the at least one first electrical contact is arranged on the filtration housing to align with the second electrical contact when the filtration housing is mounted to the appliance wall regardless of an orientation of the filtration housing.

In another aspect, the present disclosure is directed to a water filtration assembly. The water filtration assembly includes a filtration housing, at least one fluid inlet port and at least one fluid outlet port for receiving fluid from a fluid source, and at least one first electrical contact positioned on the filtration housing. The first electrical contact(s) is separate and spaced apart from the fluid inlet port(s) and the fluid outlet port(s). Thus, when the first electrical contact(s) is arranged to contact at least one second electrical contact of a power or communication source, at least one of power or one or more signals for communication or sensing is provided to the water filtration assembly. Moreover, the first electrical contact(s) is arranged on the filtration housing to align with the second electrical contact(s) of the power or communication source regardless of an orientation of the filtration housing.

In yet another aspect, the present disclosure is directed to a water filtration assembly. The water filtration assembly includes a filtration housing, at least one fluid inlet port and at least one fluid outlet port for receiving fluid from a fluid source, and at least one first electrical contact positioned on the filtration housing. The first electrical contact(s) is separate and spaced apart from the fluid inlet port(s) and the fluid outlet port(s). Thus, when the first electrical contact(s) is arranged to contact at least one second electrical contact of a power or communication source, at least one of power or one or more signals for communication or sensing is provided to the water filtration assembly. Further, the first electrical contact(s) includes a plurality of first electrical contacts extending around at least a portion of the filtration housing, with the plurality of first electrical contacts being arranged in a ring-shaped configuration extending around at least the portion of the filtration housing.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Generally, the present disclosure is directed to systems and methods for wired power and/or communication delivery for a replaceable element, such as a water filtration assembly, of an appliance, such as a refrigerator appliance. In particular, in certain embodiments, the water filtration assembly of the present disclosure generally includes a filtration housing suitable for mounting to a wall of the appliance via a manifold. The water filtration assembly further includes at least one fluid inlet port and at least one fluid outlet port secured to the manifold for receiving fluid from a fluid source. Furthermore, in an embodiment, the water filtration assembly includes an electrical connection electrically coupling the water filtration assembly to a power source. More specifically, in an embodiment, the electrical connection is separate and spaced apart from the manifold so as to separate electrical routes and connections from water routes and connections. As an example, the electrical connection may include first and second electrical contacts that, when in contact with each other, power and/or or one or more signals for communication or sensing is provided to the water filtration assembly from the power source. Moreover, the first electrical contact(s) is arranged on the filtration housing in a manner to align with the second electrical contact when the filtration housing is mounted to the appliance wall regardless of an orientation of the filtration housing.

Figure 1:
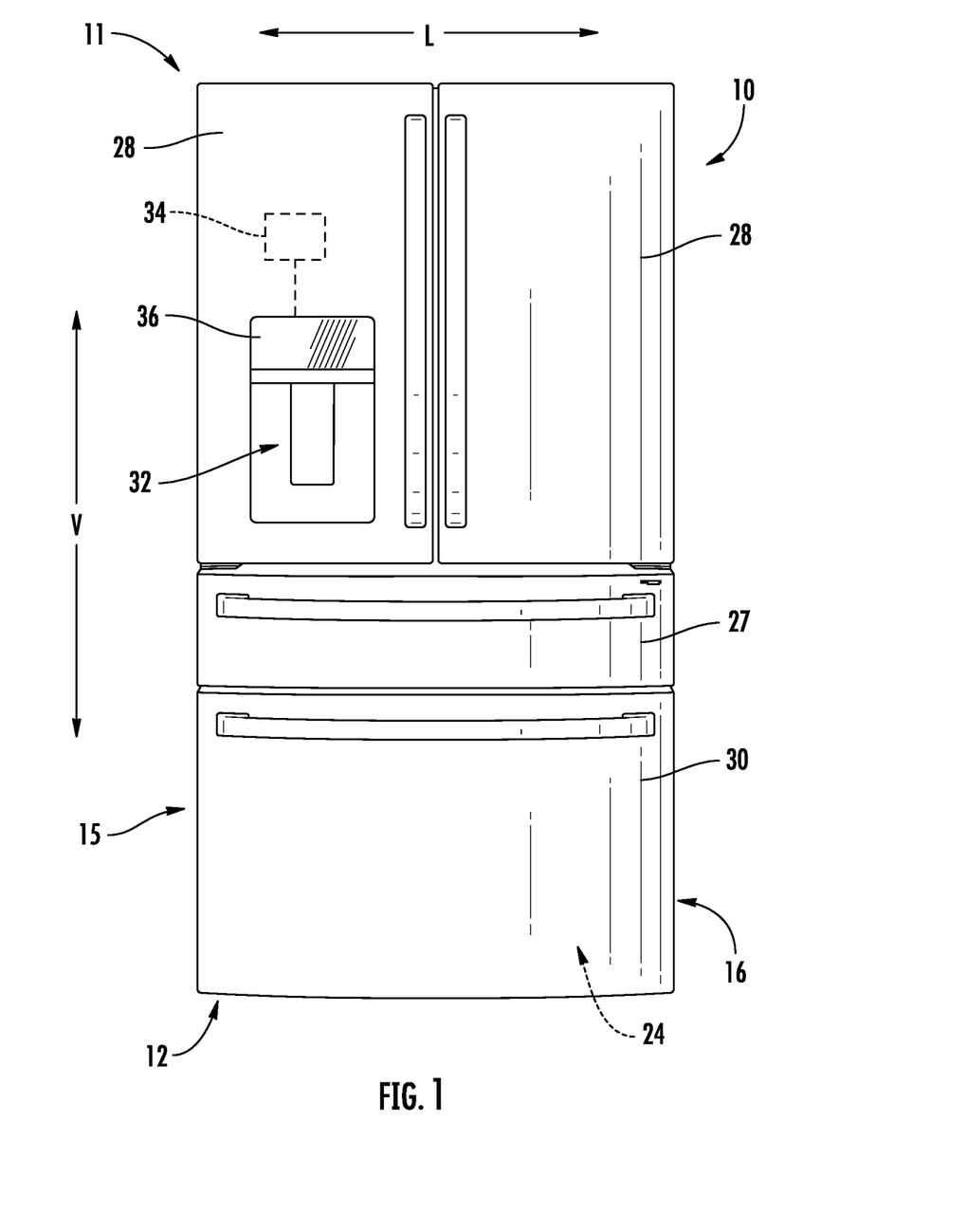
FIG. 1 illustrates a front view of an embodiment of an appliance according to the present disclosure.
Figure 2:
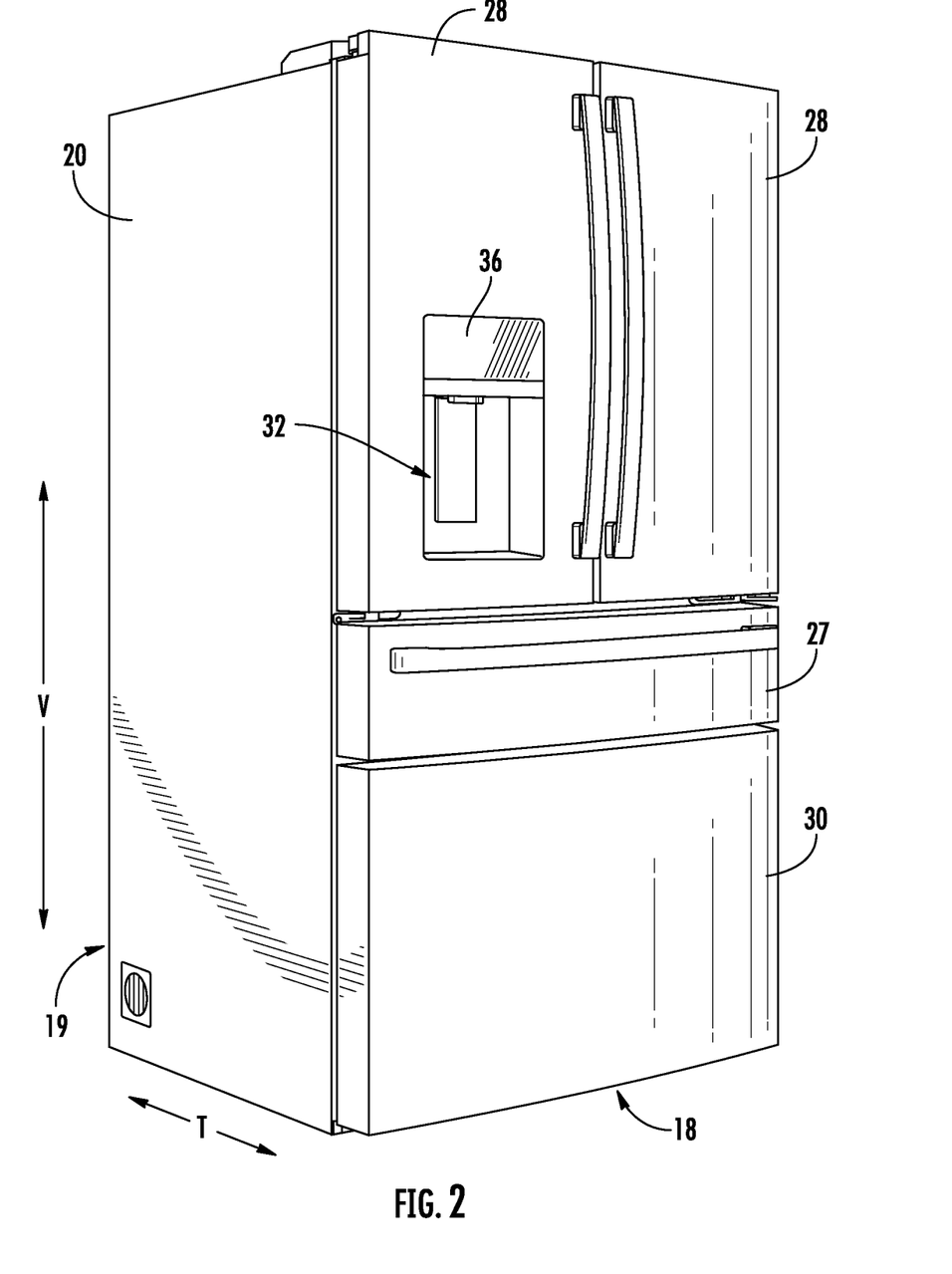
FIG. 2 illustrates a perspective view of the appliance shown in FIG. 1.
Figure 3:
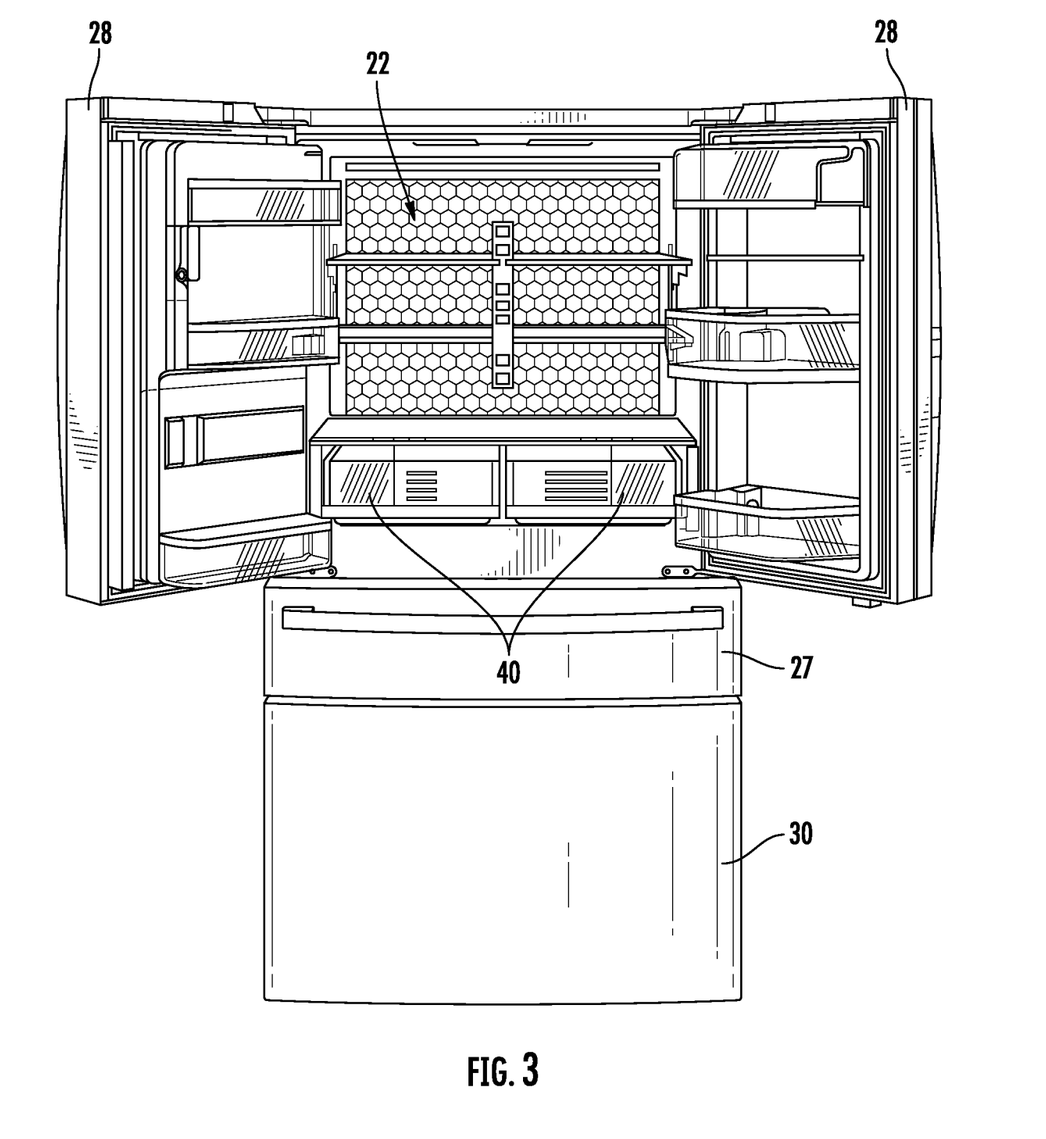
FIG. 3 illustrates a front view of the refrigerator appliance shown in FIG. 1 with doors in an open position.

Referring now to the drawings, FIG. 1 illustrates a front view of an embodiment of a refrigerator appliance 10 according to the present disclosure. FIG. 2 illustrates a perspective view of the refrigerator appliance 10 of FIG. 1. FIG. 3 illustrates a front view of the refrigerator appliance 10 of FIG. 1 with refrigerator doors 28 in an open position. Referring particularly to FIG. 1, the refrigerator appliance 10 extends between a top 11 and a bottom 12 along a vertical direction V. The refrigerator appliance 10 also extends between a first side 15 and a second side 16 along a lateral direction L. As shown in FIG. 2, a transverse direction T may additionally be defined perpendicular to the vertical and lateral directions V, L. The refrigerator appliance 10 extends along the transverse direction T between a front portion 18 and a back portion 19.

The refrigerator appliance 10 may include a cabinet or housing 20 (FIG. 2) defining an upper fresh food chamber 22 (FIG. 3) and a lower freezer storage chamber 24 arranged below the upper fresh food chamber 22 along the vertical direction V. An auxiliary food storage chamber may be positioned between the upper fresh food chamber 22 and the lower freezer storage chamber 24, e.g., along the vertical direction V. Because the lower freezer storage chamber 24 is positioned below the upper fresh food chamber 22, the refrigerator appliance 10 may be generally referred to as a bottom mount refrigerator. In the embodiment, the housing 20 may also define a mechanical compartment (not shown) for receipt of a sealed cooling system (not shown). Using the teachings disclosed herein, one of ordinary skill in the art will understand that the present technology can be used with other types of refrigerators (e.g., side-by-side) or a freezer appliance as well. Consequently, the description set forth herein is for illustrative purposes only and is not intended to limit the technology in any aspect.

Referring now particularly to FIG. 3, the refrigerator doors 28 may each be rotatably hinged to an edge of the housing 20 for accessing the upper fresh food chamber 22. It should be noted that while two refrigerator doors 28 in a "French door" configuration are illustrated, any suitable arrangement of doors utilizing one, two or more doors is within the scope and spirit of the present disclosure. A freezer door 30 may be arranged below the refrigerator doors 28 for accessing the lower freezer storage chamber 24. In the embodiment, the freezer door 30 is coupled to a freezer drawer (not shown) slidably mounted within the lower freezer storage chamber 24. An auxiliary door 27 may be coupled to an auxiliary drawer which may be slidably mounted within the auxiliary chamber.

Referring back to FIG. 1, operation of the refrigerator appliance 10 can be regulated by a controller 34 that is operatively coupled to a user interface panel 36. The user interface panel 36 may provide selections for user manipulation of the operation of the refrigerator appliance 10 to modify environmental conditions therein, such as temperature selections, etc. In some embodiments, the user interface panel 36 is proximate a dispenser assembly 32. In response to user manipulation of the user interface panel 36, the controller 34 may operate various components of the refrigerator appliance 10. Operation of the refrigerator appliance 10 may be regulated by the controller 34, e.g., the controller 34 may regulate operation of various components of the refrigerator appliance 10 in response to programming and/or user manipulation of the user interface panel 36.

The controller 34 may include a memory and one or more microprocessors, CPUs or the like, such as general or special purpose microprocessors operable to execute programming instructions or micro-control code associated with operation of the refrigerator appliance 10. The memory may represent random access memory such as DRAM, or read only memory such as ROM or FLASH. In one embodiment, the processor executes programming instructions stored in memory. The memory may be a separate component from the processor or may be included onboard within the processor. It should be noted that controller(s) 34 as disclosed herein are capable of and may be operable to perform any methods and associated method steps as disclosed herein.

The controller 34 may be positioned in a variety of locations throughout the refrigerator appliance 10. In the illustrated embodiment, the controller 34 is located within the refrigerator doors 28. In such an embodiment, input/output ("I/O") signals may be routed between the controller and various operational components of the refrigerator appliance 10. In one embodiment, the user interface panel 36 represents a general purpose I/O ("GPIO") device or functional block. In one embodiment, the user interface panel 36 includes input components, such as one or more of a variety of electrical, mechanical or electro-mechanical input devices including rotary dials, push buttons, and touch pads. The user interface panel 36 may include a display component, such as a digital or analog display device designed to provide operational feedback to a user. For example, the user interface panel 36 may include a touchscreen providing both input and display functionality. The user interface panel 36 may be in communication with the controller via one or more signal lines or shared communication busses.

Using the teachings disclosed herein, one of skill in the art will understand that the present disclosure can be used with other types of refrigerators such as a refrigerator/freezer combination, side-by-side, bottom mount, compact, and any other style or model of refrigerator appliance. Accordingly, other configurations of the refrigerator appliance 10 could be provided, it being understood that the configurations shown in the accompanying figures and the description set forth herein are by way of example for illustrative purposes only.

Figure 4:
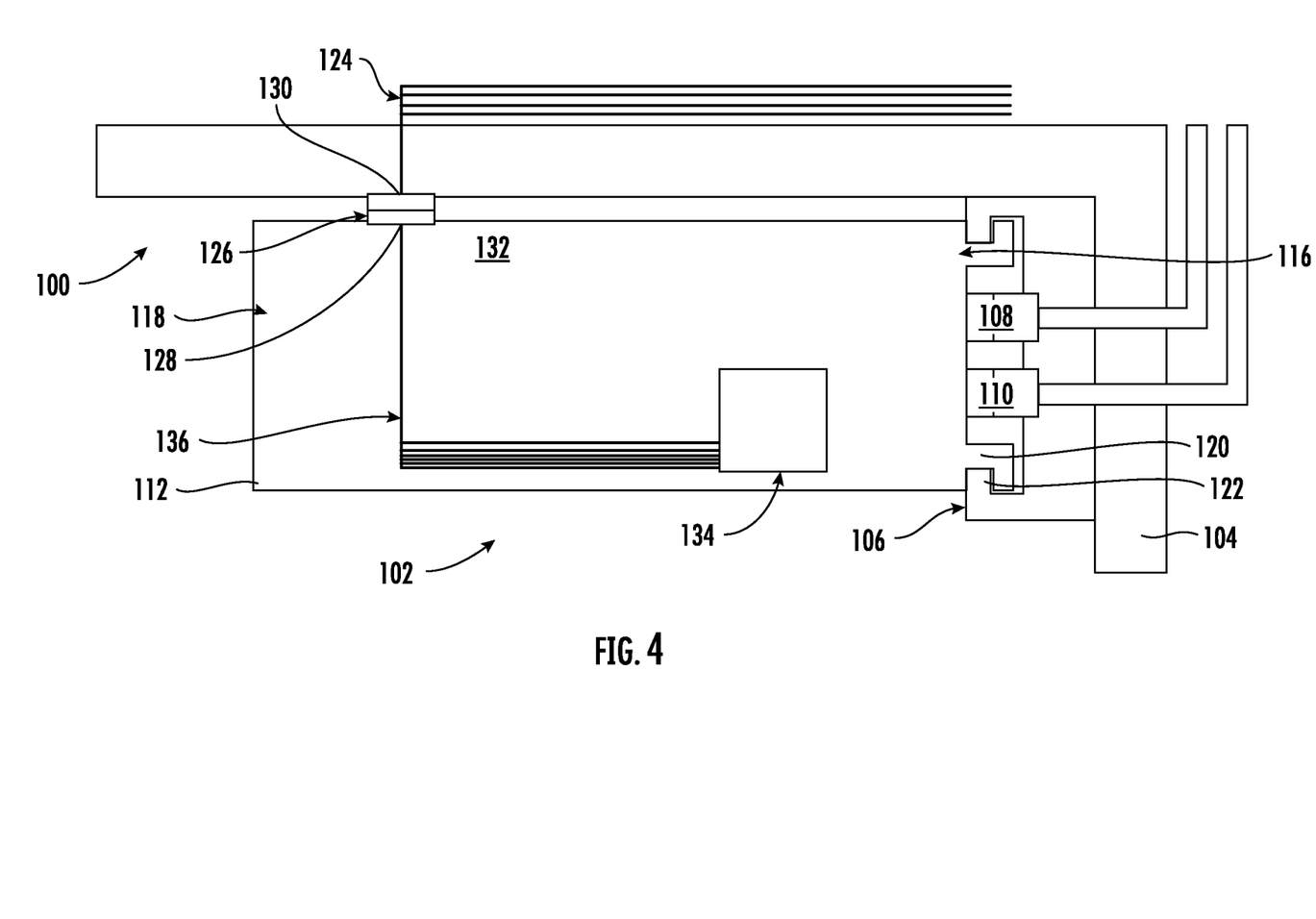
FIG. 4 illustrates a simplified side view of an embodiment of a water filtration assembly secured with an appliance according to the present disclosure.

Referring now to FIG. 4, a simplified side view of an embodiment of an appliance wall 104 of an appliance 100 (such as an interior wall, an exterior wall, a side wall, etc.) having a water filtration assembly 102 secured thereto according to the present disclosure is illustrated. In particular, as shown, the water filtration assembly 102 has a filtration housing 112 and a water filtration cartridge (not shown) within the filtration housing 112. In addition, as shown, the filtration housing 112 may have a cylindrical configuration. In further embodiments, the filtration housing 112 may have any other suitable configuration other than a cylindrical configuration. Moreover, as shown, the water filtration assembly 102 may also include a liquid receiving space 132 within the filtration housing 112 and an electronics compartment 134 having one or more electronic components (not shown) housed, at least in part, therein. In such embodiments, the electronics compartment 134 is fluidly isolated from the liquid receiving space 132, and thus fluidly isolated from the flow of water received within the liquid receiving space 132.

In further embodiments, as shown, the water filtration assembly 102 includes a manifold 106 that can be mounted to the appliance wall 104 of the appliance 100. Accordingly, as shown, the manifold 106 may generally contain a filter latching/mating interface and water connections therein.

Furthermore, as shown, the appliance 100 generally includes a water source (not shown) that provides water to and from the water filtration assembly 102, e.g., through the manifold 106 via a water inlet 108 and a water outlet 110. Thus, in certain embodiments, the water filtration assembly 102 is in fluid communication with the water inlet 108 and the water outlet 110.

In further embodiments, the filtration housing 112 includes a first end 116 opposite a second end 118. As such, in an embodiment, the first end 116 is for securing the water filtration assembly 102 to the manifold via the filter latching/mating interface, with the manifold 106 being secured to the appliance wall 104 of the appliance 100. In particular embodiments, as shown in FIG. 4, the filter latching/mating interface may include the first end 116 of the filtration housing 112 having one or more interlocking features 120 and corresponding interlocking features 122 of the manifold 106. In such embodiments, the interlocking features 120 of the first end 116 of the filtration housing 112 are configured to engage with the corresponding interlocking features 122 of the manifold 106 for securing the filtration housing 112 to the appliance 100. In further embodiments, the first end 116 of the filtration housing 112 may be secured to the manifold 106 using any suitable means.

Referring still to FIG. 4, the water filtration assembly 102 further includes an electrical connection 126 electrically coupling the water filtration assembly 102 to a power source (not shown) and/or a controller (not shown). In certain embodiments, the power source may be any suitable source of electricity. More specifically, as shown, the electrical connection 126 may include at least one first electrical contact 128 positioned on the filtration housing 112 and at least one second electrical contact 130 positioned on the appliance wall 104 of the appliance 100. Accordingly, in an embodiment, the first electrical contact(s) 128 is configured to align with the second electrical contact(s) 130 when the filtration housing 112 is mounted to the appliance wall 104 regardless of an orientation of the filtration housing 112, e.g., regardless of which side of the filtration housing 112 is facing the appliance wall 104, details of which are further explained herein below with respect to FIGS. 5-9.

Furthermore, as shown, the electrical connection 126 may include one or more electrical harnesses 136, 124. Accordingly, a first electrical harness 136 is configured to electrical couple the first electrical contact 128 to an electronics compartment 134 having one or more electronic components housed within the filtration housing 112. Moreover, as shown, a second electrical harness 124 is configured to electrical couple the second electrical contact 130 to the power source (not shown) and/or any other communication device, such as a controller.

Furthermore, as shown, the electrical connection 126 is separate and spaced apart from the manifold 106 and the flow of water received therein, e.g., separate and spaced apart from the water inlet port(s) 108 and the water outlet port(s) 110. As such, in an embodiment, when the first electrical contact(s) 128 contacts the second electrical contact(s) 130, power is provided to the water filtration assembly 102 from the power source, for example, via the electrical connection 126. In addition to providing power or in the alternative, one or more other signals for communication or sensing may also be provided to the water filtration assembly 102 when the first electrical contact(s) 128 contacts the second electrical contact(s) 130.

Figure 5:
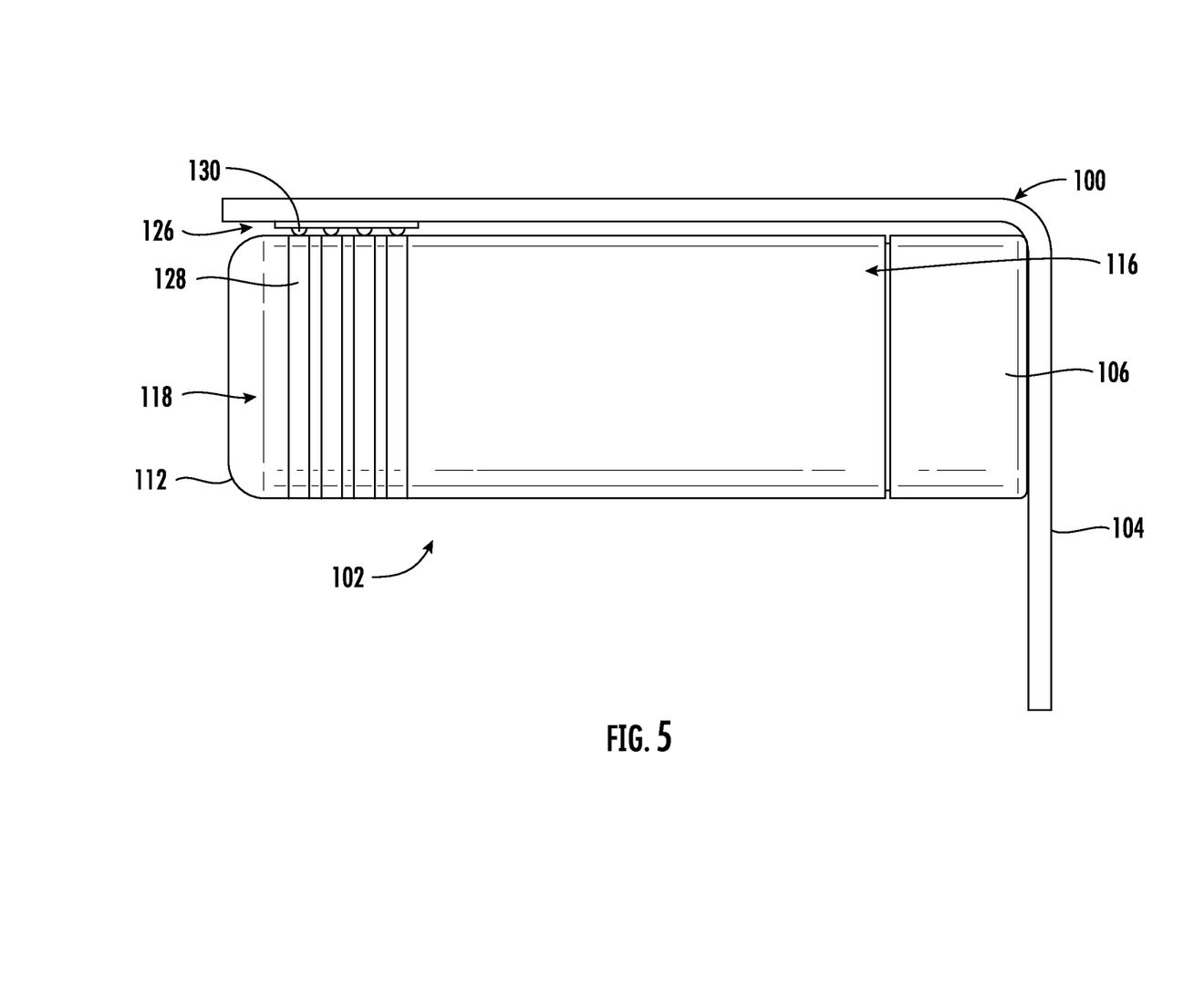
FIG. 5 illustrates a side view of an embodiment of a water filtration assembly secured with an appliance according to the present disclosure.
Figure 6:
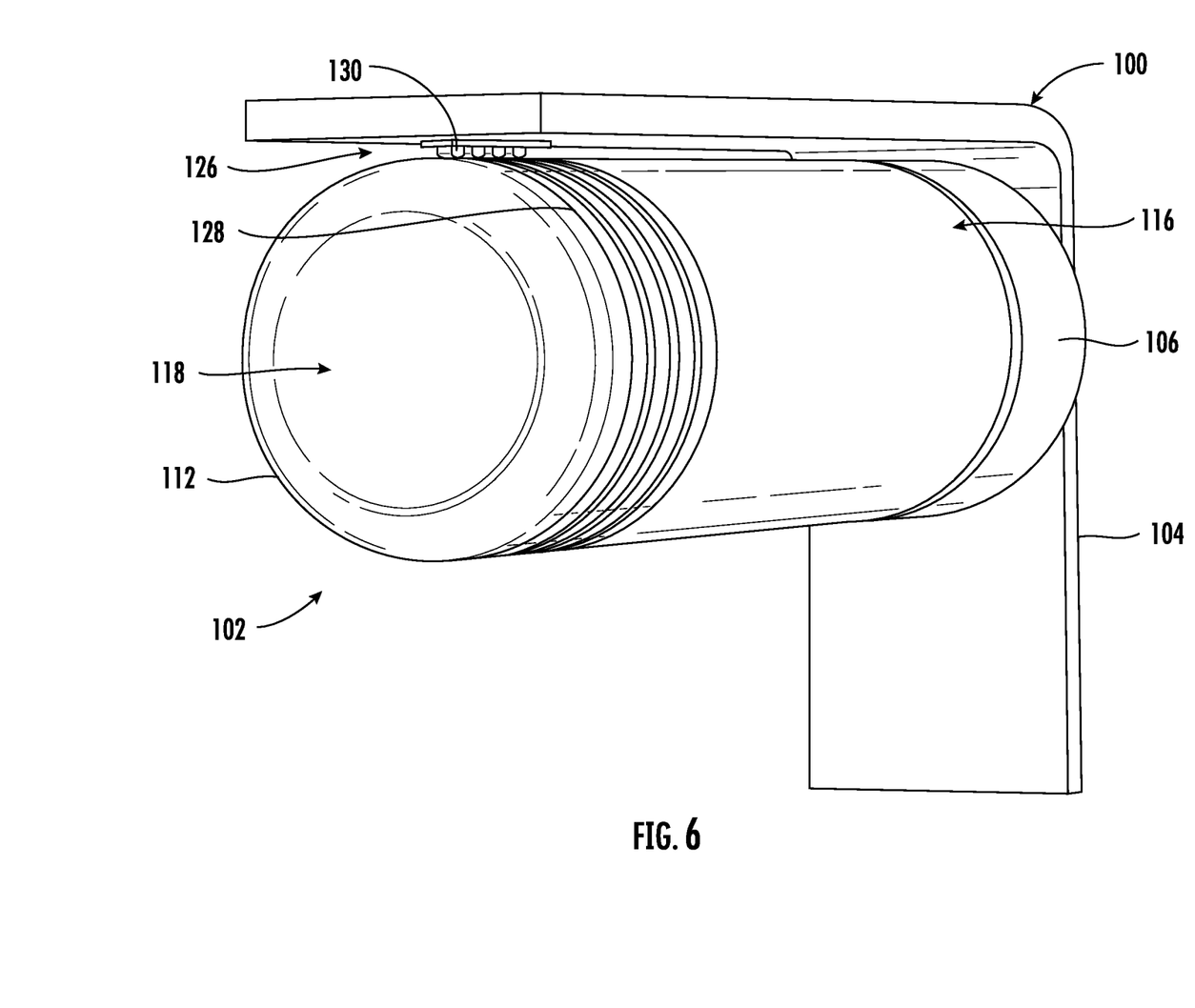
FIG. 6 illustrates a perspective view of the water filtration assembly of FIG. 5 according to the present disclosure.

Referring now to FIGS. 5 and 6, various views of an embodiment of the water filtration assembly 102 secured with the appliance 100 according to the present disclosure are provided. In particular, FIG. 5 illustrates a simplified side view of the water filtration assembly 102 102 secured with the appliance 100 according to the present disclosure, whereas and FIG. 6 illustrates a simplified perspective view of the water filtration assembly 102 secured with the appliance 100 according to the present disclosure. More specifically, as shown, FIGS. 5 and 6 illustrate details of the first and second electrical contacts 128, 130 described herein.

In particular, as shown, the water filtration assembly 102 includes a plurality of first electrical contacts 128 extending around at least a portion of the filtration housing 112 and a plurality of second electrical contacts 130 arranged on the appliance wall 104 of the appliance 100. In particular, as shown in the illustrated embodiment, each of the plurality of first electrical contacts 128 may generally have a ring-shaped configuration extending around an entire circumference of filtration housing 112. Accordingly, the ring-shaped first electrical contact(s) 128 allow for the filtration housing 112 to be installed in any orientation such that, regardless of the orientation, the first electrical contact(s) 128 align with the second electrical contact(s) 130. In such embodiments, the ring-shaped first electrical contacts 128 may be arranged adjacent to each other and may be equally spaced or separated by differing distances. In the illustrated embodiment, four first electrical contacts 128 are provided, however, it should be understood that more than four or less than four first electrical contacts 128 may be employed in the water filtration assembly 102 of the present disclosure.

Moreover, as shown, each of the plurality of second electrical contacts 130 is arranged on the appliance wall 104 of the appliance 100 to align with and contact one of the plurality of first electrical contacts 128 when the water filtration assembly 102 is mounted within the appliance 100. Thus, as shown in the illustrated embodiment, four second electrical contacts 130 are provided, however, it should be understood that more than four or less than four second electrical contacts 130 may be employed in the water filtration assembly 102 of the present disclosure, with the number of second electrical contacts 130 generally corresponding to the number of first electrical contacts 128.

Figure 7:
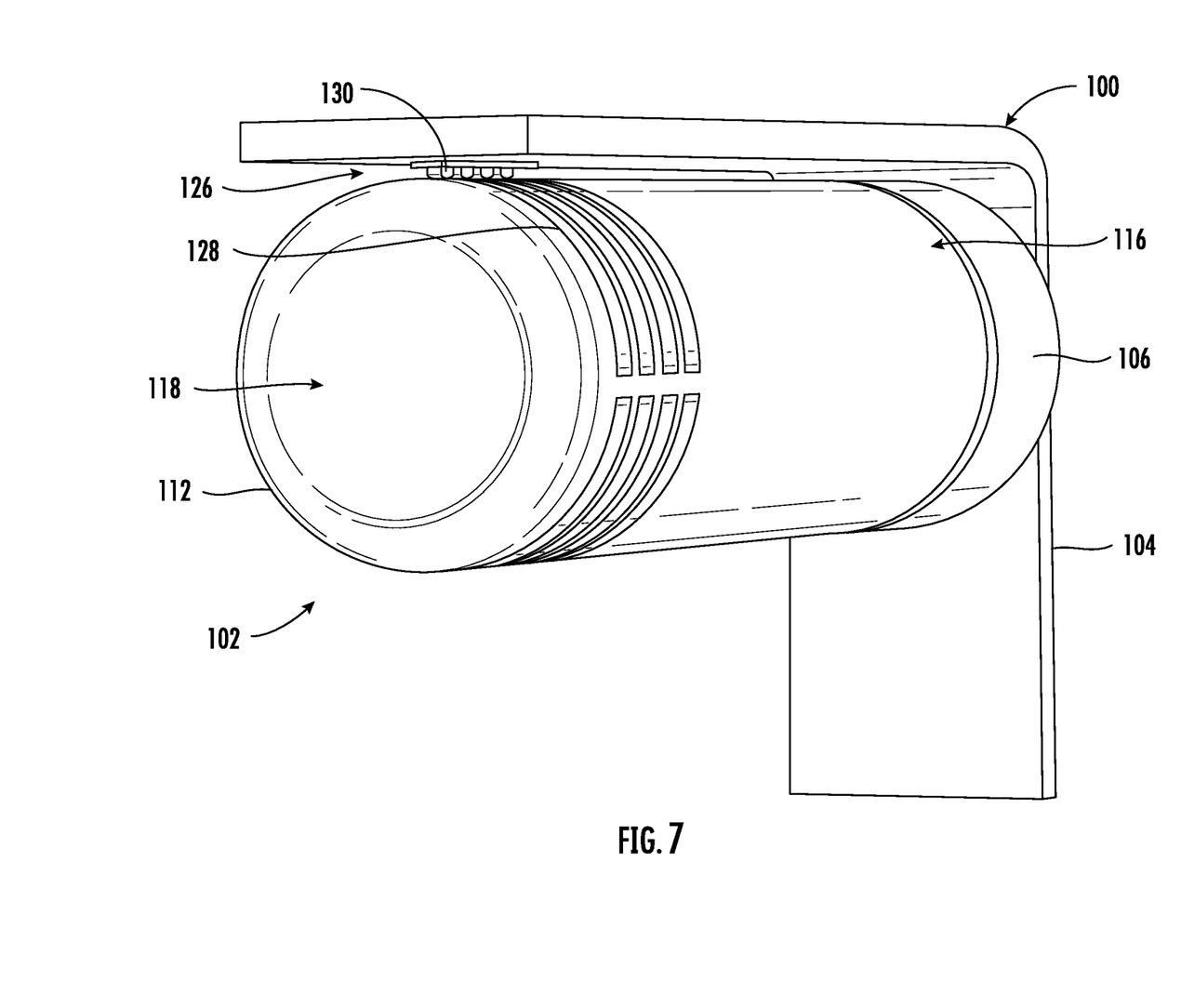
FIG. 7 illustrates a perspective view of another embodiment of a water filtration assembly secured with an appliance according to the present disclosure.

Referring now to FIG. 7, a simplified perspective view of another embodiment of a water filtration assembly 102 102 secured to an appliance wall of an appliance according to the present disclosure is illustrated. In particular, the water filtration assembly 102 is similar to the water filtration assembly 102 shown in FIGS. 5 and 6 and thus, like components will have the same numbering. Moreover, similar to FIGS. 5 and 6, the water filtration assembly 102 includes the cylindrically-shaped filtration housing 112 and the electrical connection 126 described herein, which is separate and spaced apart from the manifold 106. The electrical connection 126, in particular, includes a plurality of first electrical contacts 128 a plurality of second electrical contacts 130.

However, in contrast to the embodiment of FIGS. 5 and 6, each of the plurality of first electrical contacts 128 in FIG. 7 is discontinuous and only extends around a portion of the circumference of the filtration housing 112. As such, in an embodiment, the plurality of first electrical contacts 128 each include a plurality of arcuate segments arranged together around at least the portion of the filtration housing 112. Thus, the water filtration assembly 102 of FIG. 7 can still be installed within the appliance 100 in any suitable orientation, but does not require full ring-shaped first electrical contacts 128.

Figure 8:
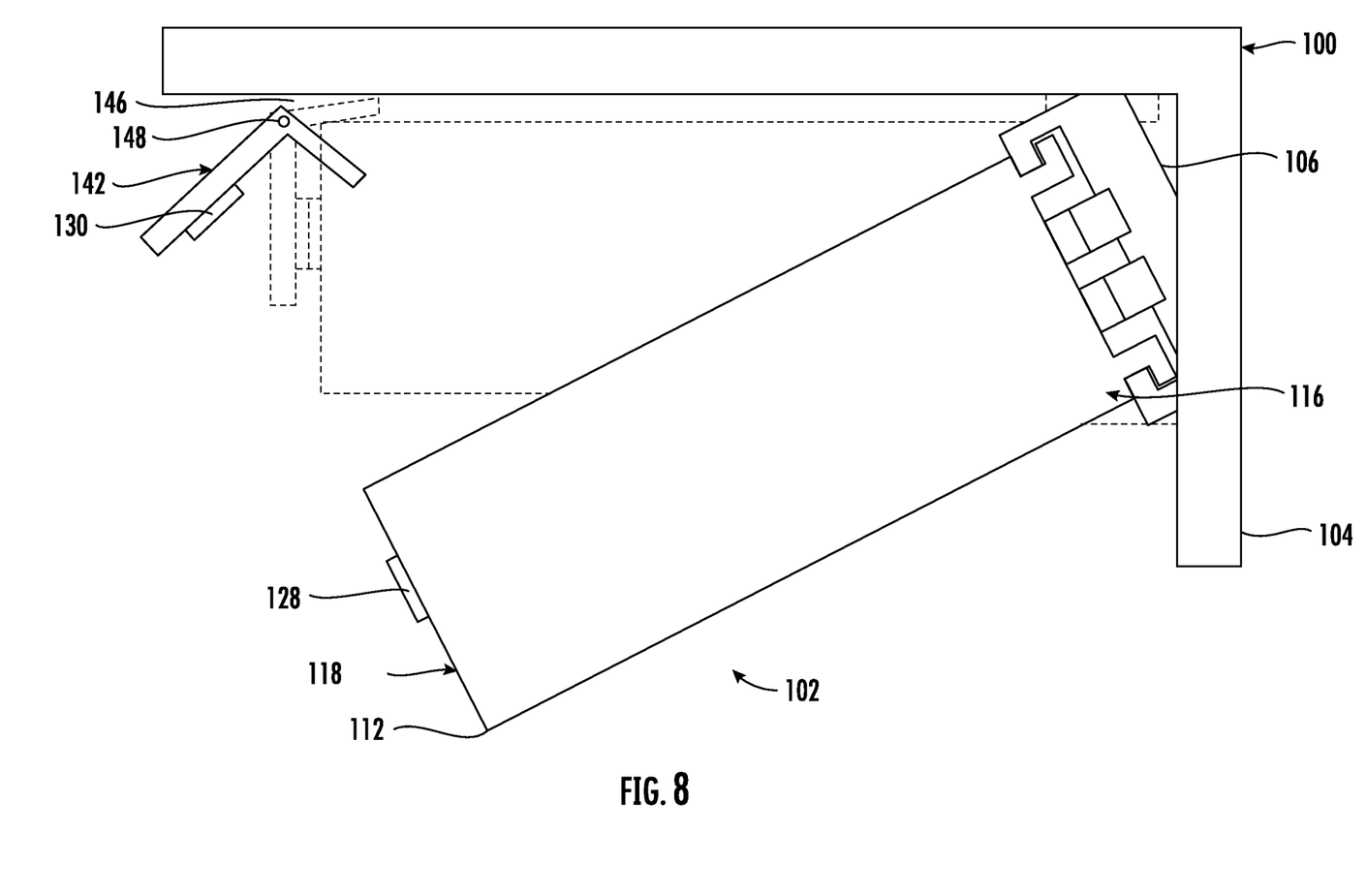
FIG. 8 illustrates a simplified side view of an embodiment of a water filtration assembly before installation within an appliance according to the present disclosure.
Figure 9:
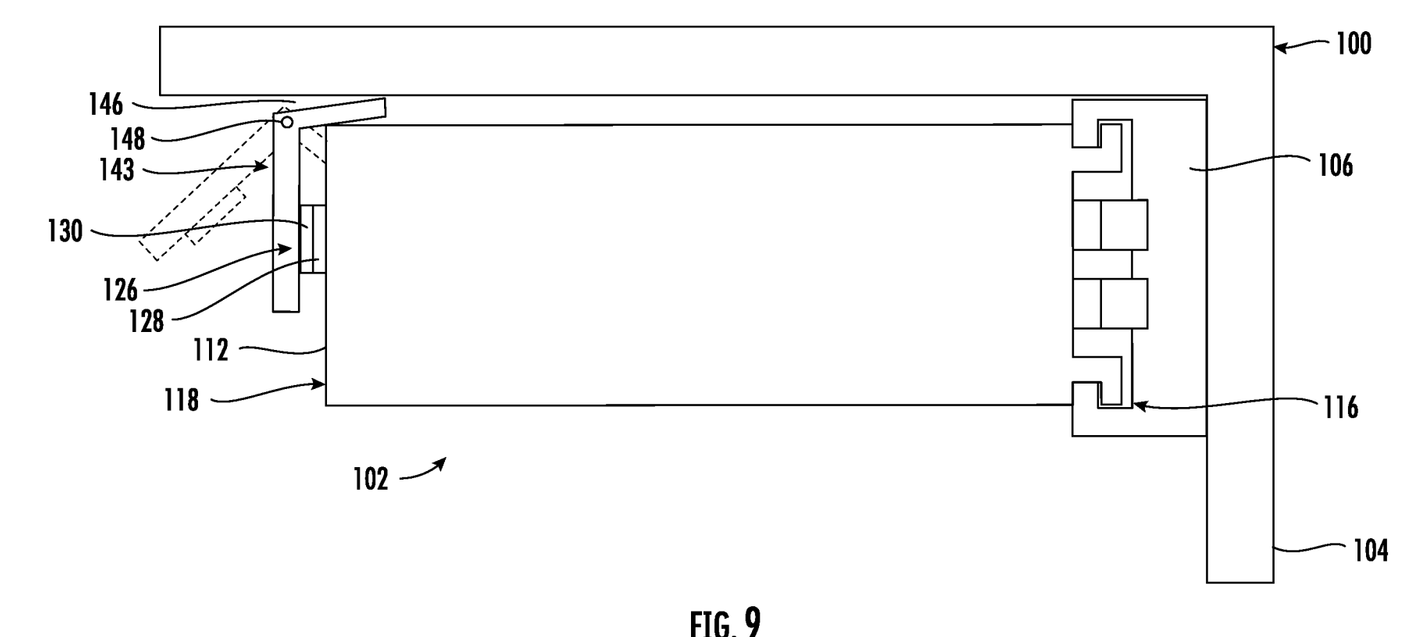
FIG. 9 illustrates a simplified side view of the embodiment of the water filtration assembly of FIG. 8 after installation within the appliance according to the present disclosure.

Referring now to FIGS. 8 and 9, schematic views of another embodiment of a water filtration assembly 102 according to the present disclosure are illustrated. FIG. 8 is a simplified side view of the water filtration assembly 102 before installation within the appliance 100, and FIG. 9 is a simplified side view of the water filtration assembly 102 after installation within the appliance 100. In particular, the water filtration assembly 102 is similar to the water filtration assembly 102 shown in FIG. 4 and thus, like components will have the same numbering. Moreover, similar to FIG. 4, the water filtration assembly 102 includes the cylindrically-shaped filtration housing 112 secured to the manifold 106 and mounted to the appliance wall 104 of the appliance 100. Further, as shown, the electrical connection 126 is separate and spaced apart from the manifold 106 and includes at least one first electrical contact 128 arranged on the filtration housing 112 and at least one second electrical contact 130 arranged on the appliance wall 104 of the appliance.

However, in contrast to the embodiments of FIGS. 4-7, wherein the plurality of first electrical contacts 128 are ring-shaped and positioned around at least a portion of the filtration housing 112, the first electrical contact 128 shown in FIGS. 8 and 9 is mounted on the second end 118 of the filtration housing 112 opposite the manifold 106 of the appliance 100. Moreover, in contrast to the embodiments of FIG. 4-7, wherein the plurality of second electrical contacts 130 are positioned on the appliance wall 104 of the appliance 100, the second electrical contact 130 shown in FIGS. 8 and 9 is mounted to a rotatable arm member 143 that is rotatably mounted to the appliance wall 104 of the appliance 100. In particular, in an embodiment, the rotatable arm member 143 may have an L-shape configuration mounted to the appliance wall 104 via a hinge point 148. In this way, when the filtration housing 112 is installed (FIG. 9) to the appliance wall 104 via the manifold 106, a portion of the filtration housing 112 engages with a portion of the rotatable arm member 143 to cause the rotatable arm member 143 to rotate about the hinge point 148. Thus, as shown, such rotation causes the first electrical contact 128 on the second end 118 of the filtration housing 112 to align with and contact the second electrical contact 130 positioned on the rotatable arm member 143.

Further aspects of the present disclosure are provided by the subject matter of the following clauses:

An appliance, comprising: an appliance wall; a water filtration assembly comprising a filtration housing mounted to the appliance wall via a manifold, the water filtration assembly further comprising at least one fluid inlet port and at least one fluid outlet port secured to the manifold for receiving fluid from a fluid source; and an electrical connection electrically coupling the water filtration assembly to a power source, the electrical connection being separate and spaced apart from the manifold, the electrical connection comprising at least one first electrical contact located on the filter housing and at least one second electrical contact located on the appliance wall, wherein, when the at least one first electrical contact is contacting the at least one second electrical contact, at least one of power or one or more signals for communication or sensing is provided to the water filtration assembly, and wherein the at least one first electrical contact is arranged on the filtration housing to align with the second electrical contact when the filtration housing is mounted to the appliance wall regardless of an orientation of the filtration housing.

The appliance of any preceding clause, wherein the at least one first electrical contact comprises a plurality of first electrical contacts extending around at least a portion of the filtration housing.

The appliance of any preceding clause, wherein each of the plurality of first electrical contacts has a ring-shaped configuration extending around at least the portion of the filtration housing.

The appliance of any preceding clause, wherein one or more of the ring-shaped configurations of the plurality of first electrical contacts is continuous and extends around an entirety of the filtration housing.

The appliance of any preceding clause, wherein one or more of the ring-shaped configurations of the plurality of first electrical contacts is discontinuous and comprises a plurality of arcuate segments extending around at least the portion of the filtration housing.

The appliance of any preceding clause, wherein the at least one second electrical contact comprises a plurality of second electrical contacts, with one or more of the plurality of second electrical contacts contacting one or more corresponding electrical contacts of the plurality of first electrical contacts.

The appliance of any preceding clause, wherein each of the plurality of first electrical contacts is positioned along a longitudinal axis of the filtration housing.

The appliance of any preceding clause, wherein the at least one first electrical contact is mounted on an end of the filtration housing opposite the manifold.

The appliance of any preceding clause, wherein the at least one second electrical contact is mounted to a rotatable arm member, the rotatable arm member mounted to the appliance wall via a hinge point, and wherein, when the filtration housing is mounted to the appliance wall via the manifold, the filtration housing causes the rotatable arm member to rotate about the hinge point such that the at least one second electrical contact contacts the at least one first electrical contact mounted on the end of the filtration housing.

The appliance of any preceding clause, wherein the appliance comprises at least one of a refrigerator appliance, an icemaker appliance, a dishwasher appliance, a water purifier appliance, a beverage system appliance, or washing machine appliance.

A water filtration assembly, comprising: a filtration housing; at least one fluid inlet port and at least one fluid outlet port for receiving fluid from a fluid source; and at least one first electrical contact positioned on the filtration housing, the at least one first electrical contact being separate and spaced apart from the at least one fluid inlet port and the at least one fluid outlet port, wherein, when the at least one first electrical contact is arranged to contact at least one second electrical contact of a power or communication source, at least one of power or one or more signals for communication or sensing is provided to the water filtration assembly, and wherein the at least one first electrical contact is arranged on the filtration housing to align with the at least one second electrical contact of the power or communication source regardless of an orientation of the filtration housing.

The water filtration assembly of any preceding clause, wherein the at least one first electrical contact of the water filtration assembly comprises a plurality of first electrical contacts extending around at least a portion of the filtration housing.

The water filtration assembly of any preceding clause, wherein each of the plurality of first electrical contacts of the water filtration assembly has a ring-shaped configuration extending around at least the portion of the filtration housing.

The water filtration assembly of any preceding clause, wherein one or more of the ring-shaped configurations of the plurality of first electrical contacts of the water filtration assembly is continuous and extends around an entirety of the filtration housing.

The water filtration assembly of any preceding clause, wherein one or more of the ring-shaped configurations of the plurality of first electrical contacts of the water filtration assembly is discontinuous and comprises a plurality of arcuate segments extending around at least the portion of the filtration housing.

The water filtration assembly of any preceding clause, wherein the at least one second electrical contact comprises a plurality of second electrical contacts, and wherein the at least one first electrical contact of the water filtration assembly is arranged on the filtration housing to align with at least one of the plurality of second electrical contacts.

The water filtration assembly of any preceding clause, wherein each of the plurality of first electrical contacts of the water filtration assembly is positioned along a longitudinal axis of the filtration housing.

The water filtration assembly of any preceding clause, wherein the at least one first electrical contact of the water filtration assembly is mounted on a first end of the filtration housing opposite a second end comprising the at least one fluid inlet port and the at least one fluid outlet port.

The water filtration assembly of any preceding clause, wherein the at least one first electrical contact of the power or communication source is mounted to a rotatable arm member.

The water filtration assembly of any preceding clause, wherein the rotatable arm member is mounted to a wall via a hinge point, and wherein the first end of the filtration housing causes the rotatable arm member to rotate about the hinge point such that the at least one second electrical contact of the power or communication source contacts the at least one electrical contact mounted on the first end of the filtration housing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance, comprising:
   an appliance wall;
   a water filtration assembly comprising a filtration housing mounted to the appliance wall via a manifold, the water filtration assembly further comprising at least one fluid inlet port and at least one fluid outlet port secured to the manifold for receiving fluid from a fluid source; and
   an electrical connection electrically coupling the water filtration assembly to a power source, the electrical connection being separate and spaced apart from the manifold, the electrical connection comprising at least one first electrical contact located on the filter housing and at least one second electrical contact located on the appliance wall,
   wherein, when the at least one first electrical contact is contacting the at least one second electrical contact, at least one of power or one or more signals for communication or sensing is provided to the water filtration assembly, and
   wherein the at least one first electrical contact is arranged on the filtration housing to align with the second electrical contact when the filtration housing is mounted to the appliance wall regardless of an orientation of the filtration housing, and
   wherein the at least one first electrical contact is mounted on an end of the filtration housing opposite the manifold.

2. The appliance of claim 1, wherein the at least one second electrical contact is mounted to a rotatable arm member, the rotatable arm member mounted to the appliance wall via a hinge point, and
   wherein, when the filtration housing is mounted to the appliance wall via the manifold, the filtration housing causes the rotatable arm member to rotate about the hinge point such that the at least one second electrical contact contacts the at least one first electrical contact mounted on the end of the filtration housing.

3. The appliance of claim 1, wherein the appliance comprises at least one of a refrigerator appliance, an icemaker appliance, a dishwasher appliance, a water purifier appliance, a beverage system appliance, or washing machine appliance.

4. A water filtration assembly, comprising:
   a filtration housing;
   at least one fluid inlet port and at least one fluid outlet port for receiving fluid from a fluid source; and
   at least one first electrical contact positioned on the filtration housing, the at least one first electrical contact being separate and spaced apart from the at least one fluid inlet port and the at least one fluid outlet port,
   wherein, when the at least one first electrical contact is arranged to contact at least one second electrical contact of a power or communication source, at least one of power or one or more signals for communication or sensing is provided to the water filtration assembly, and
   wherein the at least one first electrical contact is arranged on the filtration housing to align with the at least one second electrical contact of the power or communication source regardless of an orientation of the filtration housing, and
   wherein the at least one first electrical contact of the water filtration assembly is mounted on a first end of the filtration housing opposite a second end comprising the at least one fluid inlet port and the at least one fluid outlet port.

5. The water filtration assembly of claim 4, wherein the at least one first electrical contact of the power or communication source is mounted to a rotatable arm member.

6. A water filtration assembly, comprising:
   a filtration housing;
   at least one fluid inlet port and at least one fluid outlet port for receiving fluid from a fluid source; and
   at least one first electrical contact positioned on the filtration housing, the at least one first electrical contact being separate and spaced apart from the at least one fluid inlet port and the at least one fluid outlet port,
   wherein, when the at least one first electrical contact is arranged to contact at least one second electrical contact of a power or communication source, at least one of power or one or more signals for communication or sensing is provided to the water filtration assembly,
   wherein the at least one first electrical contact comprises a plurality of first electrical contacts extending around at least a portion of the filtration housing, and
   wherein the plurality of first electrical contacts are arranged in a ring-shaped configuration extending around at least the portion of the filtration housing, and
   wherein the at least one first electrical contact is mounted on a first end of the filtration housing opposite a second end comprising the at least one fluid inlet port and the at least one fluid outlet port.

* * * * *